United States Patent [19]
Harle

[11] Patent Number: 5,518,279
[45] Date of Patent: May 21, 1996

[54] NO-DRIP HYDRAULIC ADAPTER

[76] Inventor: William Harle, 120 Ashland County Rd. 1100, West Salem, Ohio 44287

[21] Appl. No.: 304,785

[22] Filed: Sep. 12, 1994

[51] Int. Cl.[6] ........................................................ F16L 35/00
[52] U.S. Cl. ...................... 285/332.3; 285/354; 285/349; 285/379; 285/334.3
[58] Field of Search .............................. 285/332.2, 332.3, 285/334.3, 334.5, 379, 334.1, 910, 354, 340, 341, 342

[56] References Cited

U.S. PATENT DOCUMENTS

| | | | |
|---|---|---|---|
| 1,347,834 | 7/1920 | Barber | 285/334.3 |
| 2,357,669 | 9/1944 | Lake | 285/334.3 |
| 2,362,686 | 11/1944 | De Lano | 285/332.3 |
| 2,791,452 | 5/1957 | Watson | 285/342 |
| 2,862,732 | 12/1958 | Guillou | 285/342 |
| 2,934,362 | 4/1960 | Franck | 285/341 |
| 3,016,250 | 1/1962 | Franck | 285/342 |
| 3,139,294 | 6/1964 | Richards | 285/332.3 |
| 3,226,138 | 12/1965 | Ellis | 285/332.3 |
| 3,635,499 | 1/1972 | Reddy | 285/332.3 |
| 3,733,093 | 5/1973 | Seller | 285/342 |
| 3,851,903 | 12/1974 | Nienhaus et al. | 285/341 |
| 4,138,144 | 2/1979 | Pierce, Jr. | 285/341 |
| 4,458,926 | 7/1984 | Williamson | 285/332.3 |
| 4,570,981 | 2/1986 | Fournier et al. | 285/332.3 |
| 4,969,601 | 11/1990 | Wright | 285/332.3 |
| 5,060,988 | 10/1991 | Williamson | 285/332.3 |
| 5,076,616 | 12/1991 | Williamson | 285/332.3 |
| 5,380,019 | 1/1995 | Hillery et al. | 285/332.2 |

FOREIGN PATENT DOCUMENTS

| | | | |
|---|---|---|---|
| 1333206 | 6/1963 | France | 285/332.3 |
| 1959098 | 5/1971 | Germany | 285/332.3 |
| 416240 | 1/1967 | Switzerland | 285/332.3 |

OTHER PUBLICATIONS

Klaes, J., *Hydraulics & Pneumatics,* "How to Identify International High–Pressure Hydraulic Couplings," Jan., 1990.

*Primary Examiner*—Eric K. Nicholson
*Attorney, Agent, or Firm*—Christopher John Rudy

[57] ABSTRACT

A male member to a hose adapter as for metal to metal, male to female, mating has a frustoconical sealing surface, for example, of 30, 37 or 45 degrees, for mating with a corresponding female member having a corresponding sealing surface. These surfaces are secured by a rotating female member, threads of which mate with the corresponding, threaded male member. The mating parts are drawn together as the threads are engaged and fully torqued. The male frustoconical surface is interrupted by a machined recess or undercut area, for example, of about 0.20 to 0.40 inches deep. This recess or undercut typically starts about one third of the way up the male frustoconical surface, and continues until the taper incline intersects with the threaded plane parallel to the bore of the adapter, and a recess or undercut extension can continue along the thread plane parallel or slightly tapered with respect to the bore until it reaches the base of the male thread, where it terminates. This machined space can then be taken up with a replaceable elastomer sealing boot.

17 Claims, 1 Drawing Sheet

5,518,279

NO-DRIP HYDRAULIC ADAPTER

FIELD OF THE INVENTION

The present invention concerns a hose adapter for hydraulic hose, as employed, for example, in agriculture, and in construction, machine tool, and mining industries.

BACKGROUND TO THE INVENTION

Positive sealing for hydraulic hose adapters of the male to female type is known to be through metal to metal contact between male and female members, in particularly relevant cases, along a 12, 30, 37 or 45 degree frustoconical surface thereof See, Klaes, J., *Hydraulics & Pneumatics*, "How to Identify International High-Pressure Hydraulic Couplings," January, 1990. Problems are known to exist in such systems, to include torquing, casual damage, high pressure leaks, and vibration, which result in damaged adapters and leakage.

An alternate modification is the so-called flat face O-ring seal (FFOR). The FFOR has its male part made with a flat face, rather than a conical face, and a circumferential groove is machined in the face. An O-ring is installed in the groove. The corresponding FFOR female end required a flat face stub end to be brazed to it. See, Klaes, supra., SAE J1453. The FFOR, while successful in eliminating leaks, is not cost effective to manufacture, is difficult to repair in the field due to the brazing requirement, has a continual problem of loose O-rings, which fall out, and there is no appreciative vibration dampening provided the system.

In 1985, U.S. Pat. No. 4,458,926 was issued to Williamson, for a hydraulic hose adapter with an O-ring seal. See also, corresponding Canadian Patent 1,251,237. Therein, an O-ring groove is machined in the tail of a male 37 or 45 degree JIC or SAE taper. This was an improvement over the FFOR seal in cost, but other problems still remained. The groove at the tail of the 37 or 45 degree taper weakens the fitting, and it cannot be effectively made in sizes under ⅜ of an inch. Damage to the O-ring groove can impair its ability to seal. Moreover, O-rings depend on pressure to help seal, and so, an under torqued condition combined with low pressure can engender leaks. In addition, that O-ring seal invention does not adequately address the vibration problems inherent in most hydraulic systems, and such vibration is a major cause of leakage in hydraulic systems.

OBJECTS OF THE INVENTION

It is an object of the invention to provide a hydraulic hose adapter having excellent sealing characteristics even following its mishandling in shipment or installation.

It is an object hereof to provide an improved sealing adapter employing the standard adapter of the industry.

It is an object hereof to provide an improved sealing adapter which is economical and easy to produce.

It is an object hereof to provide an improved sealing adapter having a replaceable sealing boot.

It is an object hereof to provide an elastomeric sealing device for other styles of couplings and adapters having various angles and threads to include the staple type of connecter.

It is an object hereof to provide vibration dampening.

Further objects hereof are extant.

SUMMARY OF THE INVENTION

Provided hereby, in one aspect, is a male member for attachment to an end of a hose or pipe and for coupling with an internally threaded corresponding female member having a central bore and a frustoconical female seating surface comprising:

an externally threaded male housing member with external male threads capable of engaging the threads of said female member, having a central longitudinal bore capable of being coaxial with the bore of said female member, a sidewall surrounding said bore having a distal end and a threaded portion where said external male threads are positioned, and means for attachment to said hose or pipe;

a frustoconical male housing seating surface having a tail end, complimentary to said female seating surface;

a recess in said male housing seating surface having a recess surface and capable of receiving a boot, which recess interrupts an imaginary frustoconical surface extending from said male seating surface at a position an interval from said tail end to form a seating surface lip substantially perpendicular to the axis of said bore, said lip having an outside diameter, and which recess extends shoulderward to said distal end of the housing sidewall, and an elastomeric boot seated in said recess, which boot has an inside diameter slightly smaller than the outside diameter of said lip, and which boot can contact said recess surface, extend slightly higher than and generally parallel with said imaginary frustoconical surface extending from said male seating surface when not engaged with said female seating surface but which deforms thereto when so engaged. Other aspects include said male member coupled to a female member, or without a boot, and the elastomeric boot itself.

The invention is useful in hydraulic works.

Significantly, in fulfillment of one or more of its objects, the invention provides a hydraulic hose adapter having excellent sealing characteristics even following its mishandling in shipment or installation. It can employ the standard female adapter of the industry. The adapter hereof is economically and easily produced. The sealing boot can be replaceable. The elastomeric sealing boot can be employed with other styles of couplings and adapters having various angles and threads to include the staple type of connecter. In addition, vibration dampening is provided.

Numerous further advantages attend the invention.

BRIEF DESCRIPTION OF THE DRAWINGS

The drawings form part of the specification hereof.

In the drawings, in which like numerals refer to like features, the following is noted.

ILLUSTRATIVE EMBODIMENTS

Figure 1:
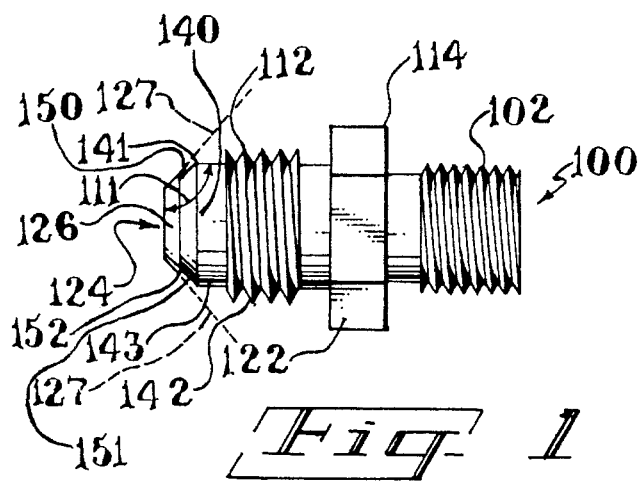
FIG. 1 is a side view of a housing of an adapter of the present invention.
Figure 2:
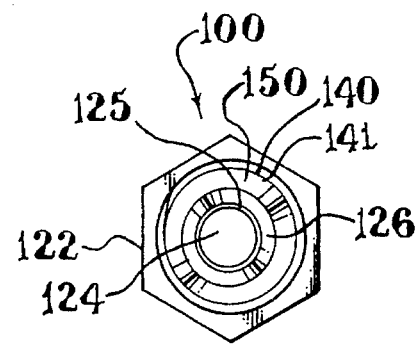
FIG. 2 is a top view of the housing of FIG. 1.
Figure 3:
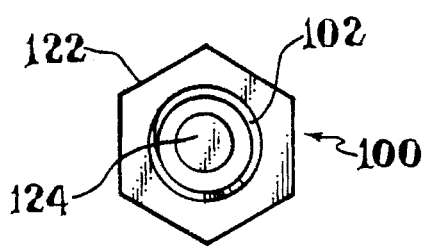
FIG. 3 is a bottom view of the housing of FIG. 1.
Figure 4:
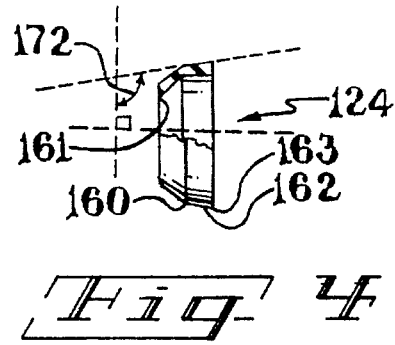
FIG. 4 is a cutaway side view of an adapter boot hereof.
Figure 5:
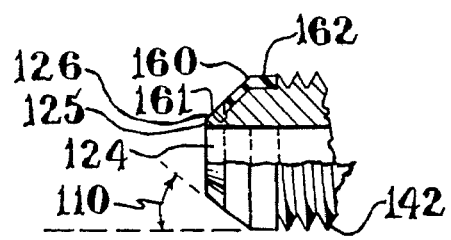
FIG. 5 is a side view of an assembled adapter hereof.
Figure 6:
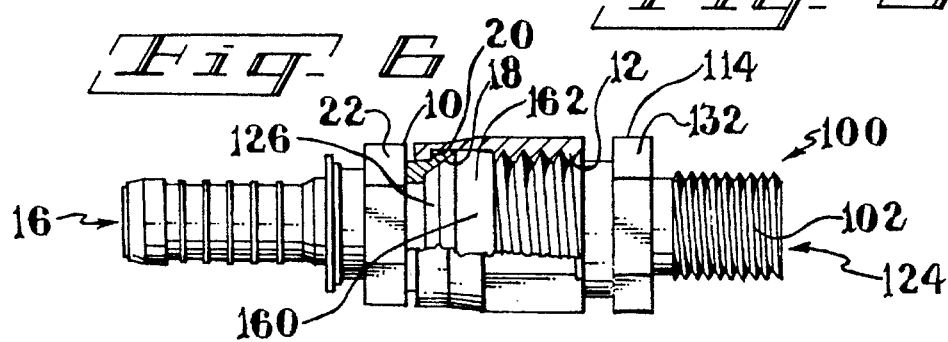
FIG. 6 is a partially sectional side view of an adapter hereof, assembled with a complimentary female member.

Documents cited herein are incorporated by reference.

Referring to the drawings, hydraulic hose adapter 100 may include a female member 10 with internal threads, which may include a threaded sleeve 12, and includes a male member 114. Preferably, the female member is a standard female member and part of a coupling known in the art as a SAE (formerly known as JIC) 37-degree flare coupling or a SAE 45-degree flare coupling. Other couplings such as a PTT 30-degree flare coupling or JIS 30-degree flare parallel thread coupling, and so forth may be employed herein. Examples of sizes of such flare couplings employable with the invention include suitably-threaded: SAE 37-degree flare couplings of 5/16 of an inch ("), 3/8", 7/16", 1/2", 9/16", 3/4", 7/8", 1 1/16", 1 3/16", 1 5/16", 1 5/8 ", 1 7/8", 2 1/2", 3" and 3 1/2"; SAE 45-degree flare couplings of 7/16", 1/2", 5/8", 3/4", 7/8" and 1 1/16"; PTT 30-degree flare couplings of 1 5/16", 1 5/8", 1 7/8" and 2 1/2"; etc The female member is provided with a central bore 16, and a smooth, female mating surface 18 which is cut at an angle to the central bore. The sleeve 12 may be provided to cooperate with land 20 so that the sleeve is secured to the female member but is rotatable with respect to the female member. This may be accomplished through crimping, or other means, as is known in the art. The female member may be provided with hex head 22 or the like to allow tightening with a wrench.

The male member 114 has external threads which cooperate with the internal threads of the female member. The male and female mating parts are drawn together as the threads are engaged and fully torqued. Like the female member, the male member is provided with a bore 124. Generally, the bores of the male and female members are coaxial about the region of threading and mating. Proximate a tail end 125 of the male member, a smooth, frustoconical male seating surface 126 is provided on the male member, which has the same angle as the female mating surface and is complimentary thereto. Mating angle 110 can be the 37-degree angle, although the 45-degree angle is not uncommon. Other angles 110, to include the 30-degree angle, may be employed. Male member sidewall 112 surrounds the bore, which has a distal end 140 and a threaded portion 142 where said external male threads are positioned. Preferably, smooth, unthreaded recess extension 143 is present between the distal end and threaded portion, which extension can be substantially parallel to the bore, i.e., be a 90-degree angle 111, or be slightly tapered so as to provide a thicker part near the threaded portion and a thinner part near the distal end such as found with an about 94-degree angle 111. In other words, the recess or undercut extension can continue along the thread plane parallel to the bore until it reaches the base of the male thread, where it terminates. The unthreaded recess extension can extend along the sidewall for a suitable distance to include about from 1/16" to 1/2", for example, about 1/8" in a 3/4" SAE 37-degree flare coupling. Means for attachment of the male member to a hose or pipe can include threads 102 and so forth. A hex head 122 or the like may be provided on the male housing member as well.

The male housing has a recess 150 in its seating surface having a recess surface 151, and the recess makes the male housing capable of receiving a boot 160. The recess 150 interrupts an imaginary frustoconical surface 127 extending from the male seating surface 126 at a position an interval from the tail end 125 to form a seating surface lip 152 substantially perpendicular to the axis of the bore 124. Thus, the male frustoconical surface is interrupted by a machined recess or undercut region, for example, of about 0.20" to 0.40" deep. The lip has an outside diameter, and the recess 150 extends to a shoulder apex 141 of the distal end 140 of the housing sidewall, i.e., it extends shoulderward. Typically, the recess surface is in essence substantially parallel to the imaginary frustoconical surface 127. Preferably, the male seating surface 126 extends radially about half the distance that the recess 150 and recess surface 151 extend. In other words, the recess or undercut can start about one third of the way up the male frustoconical surface, and continue until the taper incline intersects with the threaded plane parallel to the bore of the adapter.

An elastomeric boot 160 can be seated in the recess 150.

When employed in conjunction with a corresponding male housing member 100, the boot 160 has an inside diameter 161 slightly smaller than the outside diameter of the lip 152, for instance, about from 0.20" to 0.60" e.g., about 0.40", smaller in inside diameter than the lip outside diameter. Typically, the boot 160 contacts the recess surface 151, and is of a uniform thickness extending slightly higher than and generally parallel with the imaginary frustoconical surface 127 extending from the male seating surface 126 when not engaged with the female seating surface 18, and deforms in response to pressure from these surfaces to include the female seating surface when engaged with the same. Preferably, the boot 160 has flange 162 to fit into the region provided by the recess extension 143. When the male and female members are installed, a seal is effected below, i.e., tailward of, the boot by the standard metal to metal contact as the male and female members are brought together and torqued. When the metal faces have made full contact, the torque setting of the coupling is reached. Because the elastomer boot of the invention is slightly larger than the cavity or region in which it has been placed, it forms an outstanding if not perfect seal between the male and female members. It is secured in place by the mating male and female members and remains stable until the coupling is disassembled. Since the boot 160 is deformable but noncompressible, it flows upward into the cavity that is formed between the nut of the female and the clearance in front of the threads of the male member. Because of this condition, a live seal is obtained. The elastomer sealing boot 160 continually wants to go back to memory, and therefore, it exerts a constant force between the male and female members. This provides a seal that works equally well at high or low pressures. As well, in addition to having a slightly smaller inside diameter 161 than the lip 152, thus making the boot slightly larger than the recess 150, the outside diameter 163 of the boot typically has a uniform thickness where it fits into the recess 150 along recess surface 151, but should it be made with the flange, where it turns at the shoulder apex 141 of the distal end 140 of the housing sidewall, the angle 172 of the flange 162 is preferably greater than a 90-degree angle, for example, about a 94-degree angle, to a perpendicular with the bore. This has a definite purpose: A female member with a swivel 12 is threaded for a considerable length along its inside to engage the male threads of the male member. Not all of these female threads are engaged with the male threads at closure. Typically, from four to eight of these threads are not engaged and effectively do nothing. Particularly when the male member of the invention has a recess extension 143, when the female member is fully torqued, the surface of the recess extension and the boot flange become engaged. The resulting force from the deformable but noncompressible boot creates a locking force on the female swivel nut as well as a cushion effect isolating or insulating the female nut from the male half of the coupling. This cushion effect, together with the cushion effect from the sealing boot acting in the male member recess 150 between recess surface 151 and the female sealing surface 18, forms a desirable vibration dampening force for the entire hydraulic system.

Typically, the adapter is constructed primarily of metal except for the boot. The recess, or recess and extension, can be provided by simple undercutting of a standard male adapter known in the art, as by employing a multiple spindle screw machine, and so forth, as also known in the art.

The sealing boot is constructed of a deformable but noncompressible elastomeric material such as of a natural or synthetic rubber, and it may be made by molding, as known in the art. Advantageously, the sealing boot is replaceable. Moreover, if the elastomeric sealing boot is made of VITON (Reg. U.S. Pat. and Tm. Off.) fluoroelastomer material, the vibration dampening effect is greatly enhanced.

CONCLUSION

The present invention is thus provided. Numerous modifications can be effected by those skilled in the art within the spirit of the invention, the asserted scope of which is particularly pointed out as follows:

I claim:

1. A male member for attachment to an end of a hose or pipe and for coupling with an internally threaded corresponding female member having a central bore and a frustoconical female seating surface comprising:

an externally threaded male housing member with external male threads capable of engaging the threads of said female member, having a central longitudinal bore capable of being coaxial with the bore of said female member, a sidewall surrounding said bore having a distal end and a threaded portion where said external male threads are positioned, and means for attachment to said hose or pipe;

a frustoconical male housing seating surface having a tail end, complimentary to said female seating surface;

a recess in said male housing seating surface having a recess surface and capable of receiving a boot, which recess interrupts an imaginary frustoconical surface extending from said male seating surface at the same angle as said male seating surface and at a position which is at an interval from said tail end to form a seating surface lip substantially perpendicular to the axis of said bore, said lip having an outside diameter, and which recess extends to a shoulder apex of said distal end of the housing sidewall, and an elastomeric boot seated in said recess, which boot has an inside diameter slightly smaller than the outside diameter of said lip, and which boot can contact said recess surface, extend slightly higher than and generally parallel with said imaginary frustoconical surface extending from said male seating surface when not engaged with said female seating surface but which deforms thereto when so engaged.

2. The male member of claim 1, wherein a smooth, unthreaded recess extension extends an interval along the sidewall from its distal end at said shoulder apex toward the threaded portion.

3. The male member of claim 2, wherein said boot has a flange which resides in said recess extension.

4. The male member of claim 2, wherein said recess extension is substantially parallel with said bore.

5. The male member of claim 1, wherein said boot provides for vibration dampening.

6. The male member of claim 3, wherein said boot provides for vibration dampening.

7. The male member of claim 3, wherein said frustoconical male housing seating surface is at a standard 30-degree angle, and said recess surface is substantially parallel thereto.

8. The male member of claim 3, wherein said frustoconical male housing seating surface is at a standard 37-degree angle, and said recess surface is substantially parallel thereto.

9. The male member of claim 3, wherein said frustoconical male housing seating surface is at a standard 45-degree angle, and said recess surface is substantially parallel thereto.

10. A hydraulic adapter assembly comprising the male adapter of claim 1 coupled with an internally threaded corresponding female member having a central bore and a frustoconical female seating surface.

11. The adapter of claim 10, wherein a smooth, unthreaded recess extension extends an interval along a sidewall from its distal end at said shoulder apex toward the threaded portion of said male member.

12. The adapter of claim 11, wherein the male member has a boot with a flange residing in said recess extension.

13. A male housing member for receiving an elastomeric boot seated in a recess thereof, then for attachment to an end of a hose or pipe and for coupling with an internally threaded corresponding female member having a central bore and a frustoconical female seating surface, comprising:

an externally threaded male housing member with external male threads capable of engaging the threads of said female member, having a central longitudinal bore capable of being coaxial with the bore of said female member, a sidewall surrounding said bore having a distal end and a threaded portion where said external male threads are positioned, and means for attachment to said hose or pipe;

a frustoconical male housing seating surface having a tail end, complimentary to said female seating surface, and a recess in said male housing seating surface having a recess surface and capable of receiving a boot, which recess interrupts an imaginary frustoconical surface extending from said male seating surface at the same angle as said male seating surface and at a position which is at an interval from said tail end to form a seating surface lip substantially perpendicular to the axis of said bore, said lip having an outside diameter, and which recess extends to a shoulder apex of said distal end of the housing sidewall.

14. The male housing member of claim 13, wherein a smooth, unthreaded recess extension extends an interval along the sidewall from its distal end at said shoulder apex toward the threaded portion.

15. The male housing member of claim 14, wherein said recess extension is substantially parallel with said bore.

16. The male housing member of claim 14, wherein said frustoconical male housing seating surface and said recess surface are at a standard 37-degree angle.

17. The male housing member of claim 14, wherein said frustoconical male housing seating surface and said recess surface are at a standard 45-degree angle.

\* \* \* \* \*